United States Patent
Bakish

(10) Patent No.: US 10,311,219 B2
(45) Date of Patent: Jun. 4, 2019

(54) DEVICE, SYSTEM, AND METHOD OF USER AUTHENTICATION UTILIZING AN OPTICAL MICROPHONE

(71) Applicant: VocalZoom Systems Ltd., Yokneam Illit (IL)

(72) Inventor: Tal Bakish, Modi'in (IL)

(73) Assignee: VOCALZOOM SYSTEMS LTD., Yokneam Illit (IL)

( * ) Notice: Subject to any disclaimer, the term of this patent is extended or adjusted under 35 U.S.C. 154(b) by 0 days.

(21) Appl. No.: 15/175,063

(22) Filed: Jun. 7, 2016

(65) Prior Publication Data
US 2017/0351848 A1 Dec. 7, 2017

(51) Int. Cl.
- G06F 21/00 (2013.01)
- G06F 21/32 (2013.01)
- G06F 21/83 (2013.01)

(52) U.S. Cl.
CPC .............. G06F 21/32 (2013.01); G06F 21/83 (2013.01)

(58) Field of Classification Search
CPC ................................. G06F 21/32; G06F 21/83
See application file for complete search history.

(56) References Cited

U.S. PATENT DOCUMENTS

| | | | | |
|---|---|---|---|---|
| 6,510,415 B1 * | 1/2003 | Talmor | ............... | G07C 9/00158 704/246 |
| 7,386,448 B1 * | 6/2008 | Poss | ........................ | G10L 17/24 379/188 |
| 7,590,538 B2 * | 9/2009 | St. John | ................ | H04M 3/382 704/246 |
| 7,775,113 B2 | 8/2010 | Bakish | | |
| 8,135,957 B2 * | 3/2012 | Dinges | ............... | G06K 9/00885 713/186 |
| 8,286,493 B2 | 10/2012 | Bakish | | |

(Continued)

FOREIGN PATENT DOCUMENTS

CN 104933344 A 9/2015

OTHER PUBLICATIONS

Y. Avargel, T. Bakish, A. Dekel, G. Horovitz, Y. Kurtz, A. Moyal, "Robust speech recognition using an auxiliary laser-doppler vibrometer sensor", Proc. Speech Process Conf., 2011.*

(Continued)

*Primary Examiner* — David Garcia Cervetti
(74) *Attorney, Agent, or Firm* — Eitan Mehulal Sadot

(57) ABSTRACT

Device, system, and method of user authentication utilizing an optical microphone or laser-based microphone. An optical microphone transmits an outgoing optical signal or laser beam towards a face of a human speaker; receives an incoming optical feedback that is reflected back from the face of the human speaker; performs self-mix interferometry that is based on the outgoing optical signal and the incoming reflected optical signal; and generates a user-specific feature or characteristic that uniquely characterizes said human speaker. A user authentication module operates to authenticate the user for performing a privileged or an access-controlled action, based on the user-specific characteristic that was generated, optionally in combination with one or more biometric features or authentication requirements.

13 Claims, 2 Drawing Sheets

(56) References Cited

U.S. PATENT DOCUMENTS

| | | | |
|---|---|---|---|
| 8,856,541 B1* | 10/2014 | Chaudhury | G06F 21/32 382/115 |
| 8,949,118 B2 | 2/2015 | Avargel et al. | |
| 9,185,626 B1* | 11/2015 | Kunkel | H04W 40/02 |
| 9,247,024 B2* | 1/2016 | Talstra | G06F 21/10 |
| 9,401,148 B2 | 7/2016 | Lei | G10L 17/18 |
| 9,613,310 B2* | 4/2017 | Buibas | G06N 3/049 |
| 9,619,852 B2* | 4/2017 | Dutt | G06Q 50/265 |
| 9,620,145 B2* | 4/2017 | Bacchiani | G10L 25/30 |
| 9,646,613 B2* | 5/2017 | Blouet | G10L 15/04 |
| 9,652,915 B2* | 5/2017 | Howe | G07C 9/00158 |
| 9,665,784 B2* | 5/2017 | Derakhshani | G01S 7/539 |
| 9,679,569 B1* | 6/2017 | Foerster | G10L 17/22 |
| 9,740,841 B2* | 8/2017 | Kwok-Suzuki | G06F 21/316 |
| 9,767,787 B2* | 9/2017 | Aronowitz | G10L 17/24 |
| 9,767,817 B2* | 9/2017 | Glebe | G10L 21/0208 |
| 9,781,106 B1* | 10/2017 | Vitus | H04L 63/0861 |
| 9,786,270 B2* | 10/2017 | Senior | G10L 15/063 |
| 9,858,403 B2* | 1/2018 | Guo | G06F 21/32 |
| 9,865,253 B1* | 1/2018 | De Leon | G10L 15/083 |
| 9,892,247 B2* | 2/2018 | Ashley | G06F 21/32 |
| 2002/0055909 A1* | 5/2002 | Fung | G06Q 20/10 705/42 |
| 2002/0138768 A1* | 9/2002 | Murakami | G06K 9/00 726/5 |
| 2004/0022444 A1* | 2/2004 | Rhoads | G06K 9/00577 382/232 |
| 2004/0062423 A1* | 4/2004 | Doi | G06K 9/00221 382/118 |
| 2004/0133421 A1 | 7/2004 | Burnett et al. | |
| 2004/0230536 A1* | 11/2004 | Fung | G06Q 20/382 705/64 |
| 2005/0071166 A1* | 3/2005 | Comerford | G10L 15/25 704/272 |
| 2006/0166716 A1* | 7/2006 | Seshadri | H04M 1/6033 455/575.2 |
| 2006/0286969 A1* | 12/2006 | Talmor | G06F 21/32 455/415 |
| 2007/0165208 A1* | 7/2007 | Cowburn | G03G 21/046 356/71 |
| 2007/0198257 A1* | 8/2007 | Zhang | G10L 17/08 704/233 |
| 2007/0201443 A1* | 8/2007 | Saha | H04L 12/66 370/356 |
| 2007/0242860 A1* | 10/2007 | Hasebe | G06K 9/00255 382/118 |
| 2007/0299671 A1* | 12/2007 | McLachlan | G10L 17/26 704/500 |
| 2008/0092232 A1* | 4/2008 | Lu | G06F 21/32 726/20 |
| 2008/0149700 A1* | 6/2008 | Tuyls | G11B 20/00086 235/375 |
| 2008/0159488 A1* | 7/2008 | Raja | G10L 17/24 379/88.02 |
| 2008/0175448 A1* | 7/2008 | Fujiwara | G06K 9/00208 382/118 |
| 2008/0247586 A1* | 10/2008 | Takano | H04R 1/38 381/361 |
| 2009/0215438 A1* | 8/2009 | Mittal | H04M 3/42195 455/418 |
| 2009/0281809 A1* | 11/2009 | Reuss | G10L 17/24 704/273 |
| 2009/0287485 A1* | 11/2009 | Glebe | G10L 21/0208 704/233 |
| 2009/0328200 A1* | 12/2009 | Phoha | G06F 21/32 726/19 |
| 2010/0214214 A1* | 8/2010 | Corson | G06F 3/0325 345/158 |
| 2010/0299724 A1* | 11/2010 | Masiyowski | H04L 63/105 726/4 |
| 2011/0144997 A1* | 6/2011 | Mizuguchi | G10L 13/06 704/258 |
| 2013/0097682 A1* | 4/2013 | Zeljkovic | H04L 9/3231 726/7 |
| 2013/0102937 A1* | 4/2013 | Ehrenreich | A61H 1/00 601/47 |
| 2013/0132091 A1* | 5/2013 | Skerpac | G10L 17/005 704/273 |
| 2013/0188840 A1* | 7/2013 | Ma | G06K 9/00221 382/107 |
| 2013/0212027 A1* | 8/2013 | Sharma | G06Q 40/02 705/71 |
| 2014/0089232 A1* | 3/2014 | Buibas | G06N 3/049 706/11 |
| 2014/0149117 A1 | 5/2014 | Bakish et al. | |
| 2014/0165151 A1* | 6/2014 | Welday, Jr. | H04L 63/08 726/4 |
| 2014/0168352 A1* | 6/2014 | Verthein | H04N 7/15 348/14.08 |
| 2014/0214417 A1* | 7/2014 | Wang | G10L 17/18 704/232 |
| 2014/0289867 A1* | 9/2014 | Bukai | G06Q 20/4016 726/28 |
| 2014/0337243 A1* | 11/2014 | Dutt | G06Q 50/265 705/325 |
| 2014/0359736 A1* | 12/2014 | Harty | H04L 63/0861 726/7 |
| 2015/0019226 A1* | 1/2015 | Gazdzinski | G06Q 30/0251 704/254 |
| 2015/0127342 A1* | 5/2015 | Sharifi | G10L 17/005 704/239 |
| 2015/0248798 A1* | 9/2015 | Howe | G07C 9/00158 340/5.83 |
| 2015/0301796 A1* | 10/2015 | Visser | G06F 3/167 715/728 |
| 2015/0358317 A1* | 12/2015 | Deutschmann | H04L 63/0861 713/186 |
| 2015/0364129 A1* | 12/2015 | Gonzalez-Dominguez | G10L 15/005 704/251 |
| 2015/0371639 A1* | 12/2015 | Foerster | G10L 17/22 704/233 |
| 2016/0077615 A1* | 3/2016 | Schwarz | G06F 3/041 345/173 |
| 2016/0078880 A1* | 3/2016 | Avendano | G10L 21/02 704/202 |
| 2016/0088380 A1* | 3/2016 | Stauber | H04R 1/02 381/71.2 |
| 2016/0111091 A1 | 4/2016 | Bakish | |
| 2016/0123874 A1* | 5/2016 | Lee | G06K 9/00577 356/446 |
| 2016/0135047 A1* | 5/2016 | Park | H04W 12/06 455/411 |
| 2016/0188958 A1* | 6/2016 | Martin | G06K 9/00228 382/118 |
| 2016/0231830 A1* | 8/2016 | Nemala | G06F 3/038 |
| 2016/0293167 A1* | 10/2016 | Chen | G10L 17/18 |
| 2016/0314334 A1* | 10/2016 | He | G06K 9/0012 |
| 2016/0335483 A1* | 11/2016 | Pfursich | G06K 9/00899 |
| 2016/0335511 A1* | 11/2016 | MacDonald | G06K 9/00335 |
| 2016/0350611 A1* | 12/2016 | Zhang | G06K 9/00248 |
| 2016/0371555 A1* | 12/2016 | Derakhshani | G01S 7/539 |
| 2016/0379622 A1* | 12/2016 | Patel | G10L 13/06 704/260 |
| 2017/0020382 A1* | 1/2017 | Sezan | A61B 1/00009 |
| 2017/0024725 A1* | 1/2017 | Fung | G06Q 20/12 |
| 2017/0048403 A1* | 2/2017 | Baba | H04N 1/00127 |
| 2017/0053109 A1* | 2/2017 | Han | G06F 21/32 |
| 2017/0053664 A1* | 2/2017 | Gonzales, Jr. | G06Q 30/08 |
| 2017/0063852 A1* | 3/2017 | Azar | G06F 21/32 |
| 2017/0069327 A1* | 3/2017 | Heigold | G10L 17/18 |
| 2017/0070347 A1* | 3/2017 | Lutian | H04L 9/3231 |
| 2017/0124385 A1* | 5/2017 | Ganong | G06F 17/30244 |
| 2017/0162203 A1* | 6/2017 | Huang | G10L 15/285 |
| 2017/0177085 A1* | 6/2017 | Sun | G06F 3/016 |
| 2017/0177925 A1* | 6/2017 | Volkart | B64C 39/024 |
| 2017/0178142 A1* | 6/2017 | Dutt | G06Q 50/265 |
| 2017/0180348 A1* | 6/2017 | Piccolotto | G06K 9/00906 |
| 2017/0193208 A1* | 7/2017 | Ashley | G06F 21/32 |

(56) References Cited

U.S. PATENT DOCUMENTS

| | | | |
|---|---|---|---|
| 2017/0193213 A1* | 7/2017 | Tsou | G06F 21/32 |
| 2017/0200451 A1* | 7/2017 | Bocklet | G10L 17/06 |
| 2017/0214687 A1* | 7/2017 | Klein | H04L 63/0861 |
| 2017/0220786 A1* | 8/2017 | Guo | G06F 21/32 |
| 2017/0236520 A1* | 8/2017 | Borgstrom | G10L 17/04 |
| | | | 704/239 |
| 2017/0243042 A1* | 8/2017 | Walch | G06K 9/001 |
| 2017/0357868 A1* | 12/2017 | Derakhshani | G01S 7/539 |
| 2018/0032716 A1* | 2/2018 | McClintock | G06F 21/40 |

OTHER PUBLICATIONS

Gałka, J., Mąsior, M., and Salasa, M. 2015. Voice authentication embedded solution for secured access control. IEEE Transactions on Consumer Electronics. 60(4), 653--661. [doi>10.1109/TCE.2014.7027339].*

International Search Report for application PCT/IL2017/050515 dated Aug. 13, 2017.

* cited by examiner

US 10,311,219 B2

DEVICE, SYSTEM, AND METHOD OF USER AUTHENTICATION UTILIZING AN OPTICAL MICROPHONE

FIELD OF THE INVENTION

The present invention relates to the field of optical microphones.

BACKGROUND OF THE INVENTION

Millions of people users worldwide utilize a variety of electronic devices that may receive, capture or otherwise process audio signals. For example, cellular phones and smartphones comprise an audio microphone, allowing a user to conduct a telephone call with a remote user. Similarly, a smartphone typically comprises an audio microphone and a video camera, allowing the user to record an audio/video clip. Additionally, many laptop computers as well as tablets are typically equipped with an audio microphone able to capture audio.

Unfortunately, an audio microphone typically capture a desired audio signal (e.g., a voice of a human speaker) together with background noise, ambient noises, environmental noises, and/or audio from other non-desired sources.

SUMMARY OF THE INVENTION

Some embodiments of the present invention may provide systems, devices, and methods that comprise or utilize a laser microphone, a laser-based microphone and/or an optical microphone.

Some embodiments may comprise a device, system, and method of user authentication utilizing an optical microphone or laser-based microphone. For example, an optical microphone transmits an outgoing optical signal or laser beam towards a face of a human speaker; receives an incoming optical feedback that is reflected back from the face of the human speaker; performs self-mix interferometry that is based on the outgoing optical signal and the incoming reflected optical signal; and generates a user-specific feature or characteristic that uniquely characterizes said human speaker. A user authentication module operates to authenticate the user for performing a privileged or an access-controlled action, based on the user-specific characteristic that was generated, optionally in combination with one or more biometric features or authentication requirements.

Some embodiments of the present invention may comprises systems, devices, and methods of user authentication, user identification, user differentiation (e.g., differentiating or distinguishing among two or more users), as well as for selectively authorizing or un-authorizing an access of a user to a privileged device or system or area or service. The user authentication techniques may be performed exclusively on optical signal processing by the optical microphone; or may be performed based on a combination of two or more parameters or processes, for example, based on a combination of (i) the optical signal processing by the optical microphone, and (ii) other user-specific features or other biometric characteristics of a user (e.g., user voice; user image; user fingerprint).

In some embodiments, an optical microphone or a laser microphone may transmit a laser beam towards a face area of a human speaker; and may receive reflected optical feedback that may be reflected from the face area of the human speaker, and particularly from face-regions that vibrate while the human speaker speaks. A self-mix (SM) chamber, a self-mix interferometer unit, a vibrometer, or other suitable component may analyze the received optical chamber, in order to remotely determine or to estimate an audio signal uttered by the human speaker, based on the received optical feedback.

In some embodiments, the optical signal may be utilized for user authentication purposes, for example, to authenticate a user, to authenticate identity of a user, to authorize or to un-authorize access of a user to a privileged service or device or location, and/or as a biometric feature or user-specific characteristic which may be utilized for user authentication and/or user identification, by itself, and/or in combination with other biometric features and/or other user-specific characteristics (e.g., user image, user voice, user fingerprint, or the like).

In some embodiments, an optical sensor or optical microphone (or a hybrid optical-and-acoustic sensor, or a hybrid optical-and-acoustic microphone), may extract one or more user-specific patterns or parameters or features; which may then be utilized for user authentication or user identification, optionally in conjunction with other user-specific characteristics or biometric feature(s). The extracted parameters may further assist a system to combat or prevent attacks by impostors, human impostors and/or machine-based emulators, which may content to be the "genuine" user or the "legitimate" human user. The system may further be used to verify or confirm or ascertain Liveness of the user that attempts to authenticate, and may reduce or prevent attempts to utilize forged or fake credentials, duplicate or cloned or previously-captured credentials, imitation credentials, utilization of replay attacks, or the like.

The present invention may provide other and/or additional advantages and/or benefits.

DETAILED DESCRIPTION OF SOME EMBODIMENTS OF THE INVENTION

Figure 1A:
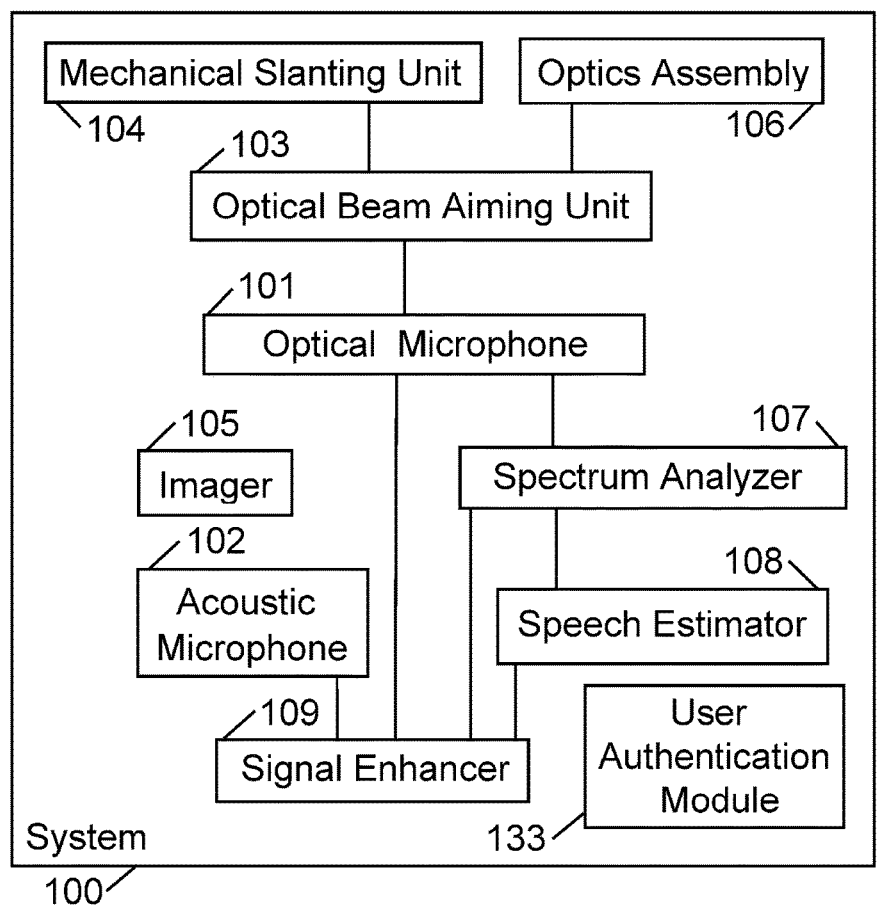
FIG. 1A is a schematic illustration of a system, in accordance with some demonstrative embodiments of the present invention.

The terms "laser" or "laser transmitter" as used herein may comprise or may be, for example, a stand-alone laser transmitter, a laser transmitter unit, a laser generator, a component able to generate and/or transmit a laser beam or a laser ray, a laser drive, a laser driver, a laser transmitter associated with a modulator, a combination of laser transmitter with modulator, a combination of laser driver or laser drive with modulator, or other suitable component able to generate and/or transmit a laser beam.

The term "acoustic microphone" as used herein, may comprise one or more acoustic microphone(s) and/or acoustic sensor(s); or a matrix or array or set or group or batch or arrangement of multiple such acoustic microphones and/or acoustic sensors; or one or more sensors or devices or units or transducers or converters (e.g., an acoustic-to-electric transducer or converter) able to convert sound into an electrical signal; a microphone or transducer that utilizes electromagnetic induction (e.g., a dynamic microphone) and/or capacitance change (e.g., a condenser microphone) and/or piezoelectricity (e.g., a piezoelectric microphones) in order to produce an electrical signal from air pressure variations; a microphone that may optionally be connected to, or may be associated with or may comprise also, a pre-amplifier or an amplifier; a carbon microphone; a carbon button microphone; a button microphone; a ribbon microphone; an electret condenser microphone; a capacitor microphone; a magneto-dynamic microphone; a dynamic microphone; an electrostatic microphone; a Radio Frequency (RF) condenser microphone; a crystal microphone; a piezo microphone or piezoelectric microphone; and/or other suitable types of audio microphones, acoustic microphones and/or sound-capturing microphones.

The term "laser microphone" as used herein, may comprise, for example: one or more laser microphone(s) or sensor(s); one or more laser-based microphone(s) or sensor(s); one or more optical microphone(s) or sensor(s); one or more microphone(s) or sensor(s) that utilize coherent electromagnetic waves; one or more optical sensor(s) or laser-based sensor(s) that utilize vibrometry, or that comprise or utilize a vibrometer; one or more optical sensor(s) and/or laser-based sensor(s) that comprise a self-mix module, or that utilize self-mixing interferometry measurement technique (or feedback interferometry, or induced-modulation interferometry, or backscatter modulation interferometry), in which a laser beam is reflected from an object, back into the laser, and the reflected light interferes with the light generated inside the laser, and this causes changes in the optical and/or electrical properties of the laser, and information about the target object and the laser itself may be obtained by analyzing these changes.

The terms "vibrating" or "vibrations" or "vibrate" or similar terms, as used herein, refer and include also any other suitable type of motion, and may not necessarily require vibration or resonance per se; and may include, for example, any suitable type of motion, movement, shifting, drifting, slanting, horizontal movement, vertical movement, diagonal movement, one-dimensional movement, two-dimensional movement, three-dimensional movement, or the like.

In some embodiments of the present invention, which may optionally utilize a laser microphone, only "safe" laser beams or sources may be used; for example, laser beam(s) or source(s) that are known to be non-damaging to human body and/or to human eyes, or laser beam(s) or source(s) that are known to be non-damaging even if accidently hitting human eyes for a short period of time. Some embodiments may utilize, for example, Eye-Safe laser, infra-red laser, infra-red optical signal(s), low-strength laser, and/or other suitable type(s) of optical signals, optical beam(s), laser beam(s), infra-red beam(s), or the like. It would be appreciated by persons of ordinary skill in the art, that one or more suitable types of laser beam(s) or laser source(s) may be selected and utilized, in order to safely and efficiently implement the system and method of the present invention. In some embodiments, optionally, a human speaker or a human user may be requested to wear sunglasses or protective eye-gear or protective goggles, in order to provide additional safety to the eyes of the human user which may occasionally be "hit" by such generally-safe laser beam, as an additional precaution.

In some embodiments which may utilize a laser microphone or optical microphone, such optical microphone (or optical sensor) and/or its components may be implemented as (or may comprise) a Self-Mix module; for example, utilizing a self-mixing interferometry measurement technique (or feedback interferometry, or induced-modulation interferometry, or backscatter modulation interferometry), in which a laser beam is reflected from an object, back into the laser. The reflected light interferes with the light generated inside the laser, and this causes changes in the optical and/or electrical properties of the laser. Information about the target object and the laser itself may be obtained by analyzing these changes. In some embodiments, the optical microphone or laser microphone operates to remotely detect or measure or estimate vibrations of the skin (or the surface) of a face-point or a face-region or a face-area of the human speaker (e.g., mouth, mouth-area, lips, lips-area, cheek, nose, chin, neck, throat, ear); and/or to remotely detect or measure or estimate the direct changes in skin vibrations; rather than trying to measure indirectly an effect of spoken speech on a vapor that is exhaled by the mouth of the speaker, and rather than trying to measure indirectly an effect of spoken speech on the humidity or relative humidity or gas components or liquid components that may be produced by the mouth due to spoken speech.

The present invention may be utilized in, or with, or in conjunction with, a variety of devices or systems that may benefit from noise reduction and/or speech enhancement; for example, a smartphone, a cellular phone, a cordless phone, a video conference system or device, a tele-conference system or device, an audio/video camera, a web-camera or web-cam, a landline telephony system, a cellular telephone system, a voice-messaging system, a Voice-over-IP system or network or device, a vehicle, a vehicular dashboard, a vehicular audio system or microphone, a navigation device or system, a vehicular navigation device or system, a mapping or route-guidance device or system, a vehicular route-guidance or device or system, a dictation system or device, Speech Recognition (SR) device or module or system, Automatic Speech Recognition (ASR) module or device or system, a speech-to-text converter or conversion system or device, a laptop computer, a desktop computer, a notebook computer, a tablet, a phone-tablet or "phablet" device, a gaming device, a gaming console, a wearable device, a smart-watch, a Virtual Reality (VR) device or helmet or glasses or headgear, an Augmented Reality (AR) device or helmet or glasses or headgear, an Internet of Things (IoT) device or appliance, an Internet-connected device or appliance, a wireless-connected device or appliance, a device or system or module that utilizes speech-based commands or audio commands, a device or system that captures and/or records and/or processes and/or analyzes audio signals and/or speech and/or acoustic signals, and/or other suitable systems and devices.

Some embodiments of the present invention may provide or may comprise a laser-based device or apparatus or system, a laser-based microphone or sensor, a laser microphone or sensor, an optical microphone or sensor, a hybrid acoustic-optical sensor or microphone, a combined acoustic-optical sensor or microphone, and/or a system that comprises or utilizes one or more of the above.

Reference is made to FIG. 1A, which is a schematic block-diagram illustration of a system 100, in accordance with some demonstrative embodiments of the present invention.

System 100 may comprise, for example, an optical microphone 101 able to transmit an optical beam (e.g., a laser beam) towards a target 199 (e.g., a face of a human speaker), and able to capture and analyze the optical feedback that is reflected from the target 199, particularly from vibrating regions or vibrating face-regions or face-portions of the human speaker. The optical microphone 101 may be or may comprise or may utilize a Self-Mix (SM) chamber or unit, an interferometry chamber or unit, an interferometer, a vibrometer, a targeted vibrometer, or other suitable component, able to analyze the spectrum of the received optical signal with reference to the transmitted optical beam, and able to remotely estimate the audio or speech or utterances generated by the target 199 (e.g., the human speaker).

Optionally, system 100 may comprise an acoustic microphone 102 or an audio microphone, which may capture audio. Optionally, the analysis results of the optical feedback may be utilized in order to improve or enhance or filter the captured audio signal; and/or to reduce or cancel noise(s) from the captured audio signal. Optionally, system 100 may be implemented as a hybrid acoustic-and-optical sensor, or as a hybrid acoustic-and-optical sensor. In other embodiments, system 100 need not necessarily comprise an acoustic microphone. In yet other embodiments, system 100 may comprise optical microphone 102 and may not comprise any acoustic microphones, but may operate in conjunction with an external or a remote acoustic microphone.

System 100 may further comprise an optical beam aiming unit 103 (or tilting unit, or slanting unit, or positioning unit, or targeting unit, or directing unit), for example, implemented as a laser beam directing unit or aiming unit or other unit or module able to direct a transmitted optical beam (e.g., a transmitted laser beam) towards target 199, and/or able to fine-tune or modify the direction of such optical beam or laser beam. The directing or alignment of the optical beam or laser beam, towards the target 199, may be performed or achieved by using one or more suitable mechanisms.

In a first example, the optical microphone 101 may be fixedly mounted or attached or located at a first location or point (e.g., on a vehicular dashboard; on a frame of a screen of a laptop computer), and may generally point or be directed towards an estimated location or a general location of a human speaker that typically utilizes such device (e.g., aiming or targeting an estimated general location of a head of a driver in a vehicle; or aiming or targeting an estimated general location of a head of a laptop computer user); based on a fixed or pre-mounted angular slanting or positioning (e.g., performed by a maker of the vehicular dashboard or vehicle, or by the maker of the laptop computer).

In a second example, the optical microphone may be mounted on a wall of a lecture hall; and may be fixedly pointing or aiming its laser beam or its optical beam towards a general location of a stage or a podium in that lecture hall, in order to target a human speaker who is a lecturer.

In a third example, a motor or engine or robotic arm or other mechanical slanting unit 104 may be used, in order to align or slant or tilt the direction of the optical beam or laser beam of the optical microphone, towards an actual or an estimated location of a human speaker; optionally via a control interface that allows an administrator to command the movement or the slanting of the optical microphone towards a desired target (e.g., similar to the manner in which an optical camera or an imager or a video-recording device may be moved or tilted via a control interface, a pan-tilt-zoom (PTZ) interface, a robotic arm, or the like).

In a fourth example, an imager 105 or camera may be used in order to capture images or video of the surrounding of the optical microphone; and a face-recognition module or image-recognition module or a face-identifying module or other Computer Vision algorithm or module may be used in order to analyze the captured images or video and to determine the location of a human speaker (or a particular, desired, human speaker), and to cause the slanting or aiming or targeting or re-aligning of the optical beam to aim towards the identified human speaker. In a fifth example, a human speaker may be requested to wear or to carry a particular tag or token or article or object, having a pre-defined shape or color or pattern which is not typically found at random (e.g., tag or a button showing a green triangle within a yellow square); and an imager or camera may scan an area or a surrounding of system 100, may analyze the images or video to detect or to find the pre-defined tag, and may aim the optical microphone towards the tag, or towards a pre-defined or estimated offset distance from that tag (e.g., a predefined K degrees of slanting upwardly or vertically relative to the detected tag, if the human speaker is instructed to carry the tag or to wear the tag on his jacket pocket).

In a sixth example, an optics assembly 106 or optics arrangement (e.g., one or more mirrors, flat mirrors, concave mirrors, convex mirrors, lenses, prisms, beam-splitters, focusing elements, diffracting elements, diffractive elements, condensing elements, and/or other optics elements or optical elements) may be utilized in order to direct or aim the optical beam or laser beam towards a known or estimated or general location of a target or a speaker or a human face. The optics assembly may be fixedly mounted in advance (e.g., within a vehicle, in order to aim or target a vehicular optical sensor towards a general-location of a driver face), or may be dynamically adjusted or moved or tilted or slanted based on real-time information regarding the actual or estimated location of the speaker or his head (e.g., determined by using an imager, or determined by finding a Signal to Noise Ratio (SNR) value that is greater than a threshold value).

In a seventh example, the optical microphone may move or may "scan" a target area (e.g., by being moved or slanted via the mechanical slanting unit 104); and may remain at, or may go-back to, a particular direction in which the Signal to Noise Ratio (SNR) value was the maximal, or optimal, or greater than a threshold value.

In an eighth example, particularly if the human speaker is moving on a stage or moving in a room, or moves his face to different directions, the human speaker may be requested or required to stand at a particular spot or location in order to enable the system to efficiently work (e.g., similarly to the manner in which a singer or a performer is required to stand in proximity to a wired acoustic microphone which is mounted on a microphone stand); and/or the human speaker may be requested or required to look to a particular direction or to move his face to a particular direction (e.g., to look directly towards the optical microphone) in order for the system to efficiently operate (e.g., similar to the manner in which a singer or a performer may be requested to look at a camera or a video-recorder, or to put his mouth in close proximity to an acoustic microphone that he holds).

Other suitable mechanisms may be used to achieve or to fine-tune aiming, targeting and/or aligning of the optical beam with the desired target.

It is clarified that the optical microphone and/or the system of the present invention, need not be continuously aligned with the target or the human speaker, and need not necessarily "hit" the speaker continuously with laser beam or optical beam. Rather, in some embodiments, the present invention may operate only during time-periods in which the optical beam or laser beam actually "hits" the face of the speaker, or actually causes reflection of optical feedback from vibrating face-regions of the human speaker. In some embodiments, the system may operate or may efficiently operate at least during time period(s) in which the laser beam(s) or the optical signal(s) actually hit (or reach, or touch) the face or the mouth or the mouth-region of a speaker; and not in other time-periods or time-slots. In some embodiments, the system and/or method need not necessarily provide continuous speech enhancement or continuous noise reduction or continuous speech detection; but rather, in some embodiments the speech enhancement and/or noise reduction and/or speech detection may be achieved in those specific time-periods in which the laser beam(s) actually hit the face of the speaker and cause a reflection of optical feedback from vibrating surfaces or face-regions. In some embodiments, the system may operate only during such time periods (e.g., only a few minutes out of an hour; or only a few seconds out of a minute) in which such actual "hit" of the laser beam with the face-region is achieved. In other embodiments, continuous or substantially-continuous noise reduction and/or speech enhancement may be achieved; for example, in a vehicular system in which the laser beam is directed towards the location of the head or the face of the driver.

In accordance with the present invention, the optical microphone 101 may comprise a self-mix chamber or unit or self-mix interferometer or a targeted vibrometer, and may utilize reflected optical feedback (e.g., reflected feedback of a transmitted laser beam) in order to remotely measure or estimate vibrations of the facial skin or facial-regions head-regions of a human speaker, utilizing a spectrum analyzer 107 in order to analyze the optical feedback with reference to the transmitted optical feedback, and utilizing a speech estimator unit 108 to estimate or extract a signal that corresponds to speech or audio that is generated or uttered by that human speaker.

Optionally, system 100 may comprise a signal enhancer 109, which may enhance, filter, improve and/or clean the acoustic signal that is captured by acoustic microphone 102, based on output generated by the optical microphone 101. For example, system 100 may dynamically generate and may dynamically apply, to the acoustic signal captured by the acoustic microphone 102, a digital filter which may be dynamically constructed by taking into account the output of the optical microphone 101, and/or by taking into account an analysis of the optical feedback or optical signal(s) that are reflected back from the face of the human speaker.

System 100 may further comprise a user authentication module 133, which may be integrated with or integral to system 100, or which may be otherwise associated with or coupled to system 100, or which may be connected to system 100 (e.g., via a wired communication link and/or wireless communication link). User authentication module 133 may perform user authentication and/or user identification, based on (at least partially; or entirely) the output of the optical microphone 102. For example, user authentication module 133 may authenticate (or un-authenticate) a user based on a match (or a mismatch) between fresh, current, characteristics that are revealed from the reflected optical signal, and previously-extracted characteristics that were previously deduced from a prior usage session of a previously-authenticated user. The user authentication module 133 may take into account the current, fresh, output of the optical microphone 102; and optionally, also, one or more other user-specific features or biometric characteristics (e.g., voice sample; fingerprint; user image), in order to reach an authentication decision.

User authentication module 133, as well as system 100, may be utilized in order to allow or disallow access of a user to a variety of devices or services; for example: to access or to start engaging with a computer or smartphone or tablet or other electronic device; to access or to ignite a vehicle; to access a building or a room or other location; to pass through a gate or entry or exit or turnstile; to access an offline service (e.g., a locally-running application); to access a remote service or an online service or website or webpage, through a Web browser or through a native application; to access an Automatic Teller Machine (ATM) or other kiosk type machine; to access a banking website or service, or a brokerage website or service; and/or for various other purposes, and in conjunction with various other systems and devices.

Figure 1B:
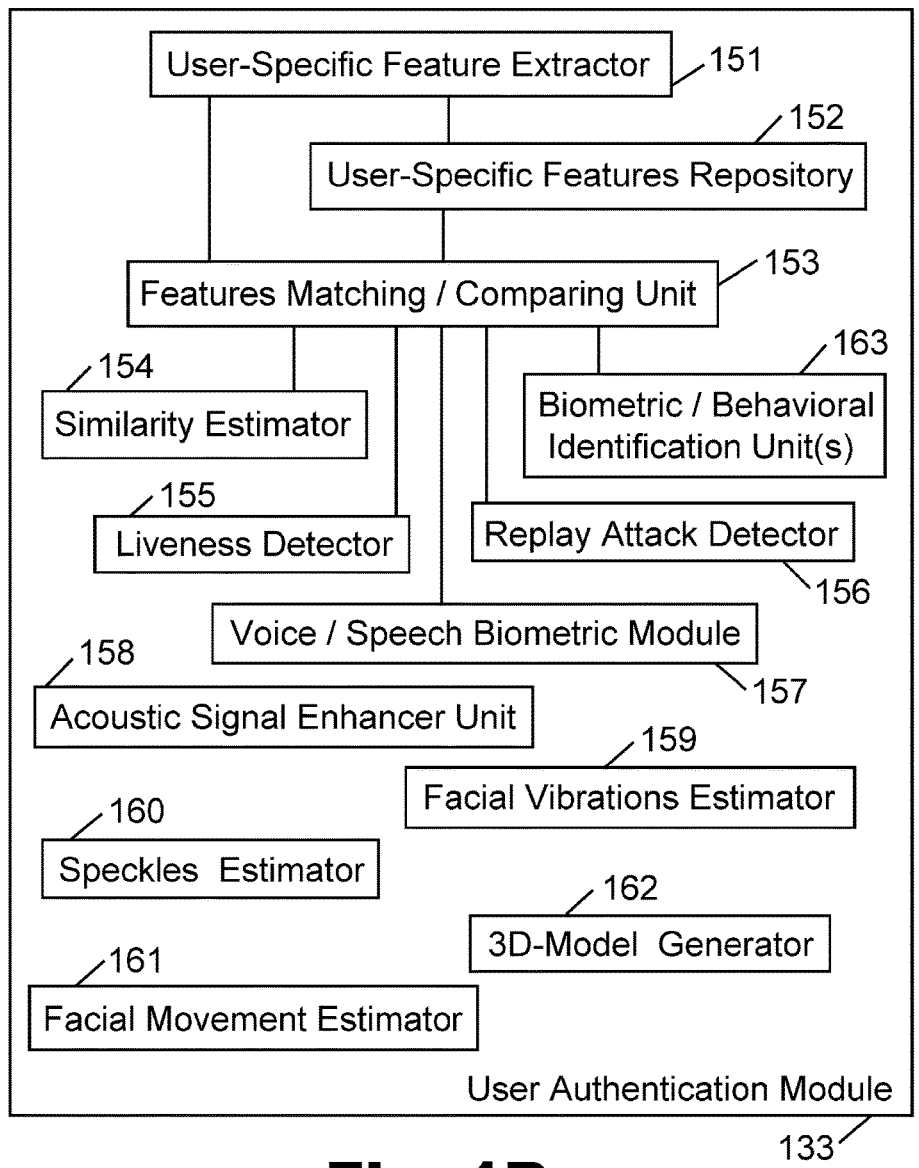
FIG. 1B is a schematic block-diagram illustration of a user authentication module, in accordance with some demonstrative embodiments of the present invention.

In order to not over-crowd FIG. 1A with components and elements, reference is now made to FIG. 1B, which is a schematic block-diagram illustration of the user authentication module 133 and its components, in accordance with some demonstrative embodiments of the present invention. It is clarified that some or all of the components that are shown in FIG. 1B, may be included within system 100 of FIG. 1A; and/or optionally, may be located or co-located within other modules or other units of system 100 FIG. 1A; and/or may be located in other devices which may be in communication with, or connected to, system 100 of FIG. 1A.

User authentication module 133 may comprise a user-specific feature extractor 151 able to extract a user-specific characteristic or feature or pattern or signal or indicator, from the received or reflected optical signal, and/or from the output of the optical microphone 101, and/or from the self-mix interferometry or remote vibrometry performed by the optical microphone. For example, Applicants have realized that each human speaker may speak and may utter speech in a different manner (e.g., moving his lips or face or chin in a particular and user-specific manner), and/or that each human speaker may cause different type, strength, amplitude, intensity, frequency and/or other characteristics of vibrations of the face or facial-region or skin or skin-region or mouth or mouth-surrounding-region, which thus may cause a different and/or distinguishing reflection of optical signal or laser beam(s); thereby enabling the user-specific feature extractor 151 to extract such unique user-specific feature based on such reflected optical signal and/or its self-mix with the transmitted signal or with a replication of the transmitted signal.

The extracted user-specific characteristic may be stored or may be securely stored, in a user-specific features repository 152; for example, locally (e.g., in a storage unit or memory unit which may be co-located with the optical microphone 101 or in proximity thereto) and/or remotely (e.g., in a remote server or repository, or in a "big data" repository or a "cloud computing" repository) and/or in other suitable storage device or memory unit (e.g., in an organizational server or enterprise server computer; in a smartphone or tablet or smart-watch). The data stored in the user-specific features repository may indicate one or more identifiers or data-items about the user from whom the data was collected (e.g., name, date-of-birth, employee number, user-name, or the like), as well as a representation of the user-specific feature that was extracted (e.g., as a digital signature, digital profile, one or more numerical values, one or more strings). Optionally, one or more portions of the data may also be stored (e.g., raw data describing the reflected optical signal, and/or raw data reflecting the self-mix signal, and/or data indicating processed or partially-processed optical signals). An initial user-specific feature or set-of-features, that were initially extracted for an authenticated user, may be stored and may be referred to as a "reference feature" or "reference features".

In a subsequent usage session, a "fresh" user or a "current" user may attempt to authenticate to the system; and the user-specific feature extractor 151 may extract a fresh or a current user-specific feature for that fresh user or current user. The freshly-extracted feature value, may be compared by a features matching/comparing unit 153 to the previously-extracted or previously-stored user-specific feature(s) of one or more previously-authenticated user(s), or to the user-specific features that were already extracted in the past for a particular previously-authenticated user. If a match is found (e.g., if the features are identical, or are generally identical, or are generally similar, or are similar by at least a pre-defined similarity threshold), then the user authentication module 133 may declare that the user is authenticated. If a match is not found, then the user authentication module 133 may declare that the user is not authenticated, and may optionally trigger further actions (e.g., trigger a process which gives to the user a "second attempt" for authentication; trigger a process that notifies a fraud department or a security team about a possible fraud; trigger a process that requires the user to perform other steps or additional steps for authentication; or the like).

In some embodiments, the features matching/comparing unit 153 may optionally comprise, or may be associated with, a Similarity Estimator 154 or similarity estimation unit or similarity estimation module, or a similarity score generator, able to compare between the fresh indicator and the historic indicator, and able to determine a similarity score indicating how similar (or how dissimilar) the fresh indicator value is, relative to the historic indicator value. The similarity score, or other similarity indicators, may be used in order to determine whether a fresh sample "matches" (is sufficiently similar to) a previously-stored sample, and/or in order to determine whether a fresh sample "matches" (is sufficiently similar to) a pre-defined reference value. Optionally, one or more similarity threshold values may be used, in order to enable the similarity estimator 154 to determine whether a current similarity score indicates sufficient similarity to a previous sample or to a reference value.

In a demonstrative example, if user David has provided one or more historic samples, in which user David had a moustache; and currently user David shaved his moustache; then, a fresh sampling of the optical signal that is reflected back from the user David, may still be similar to the historic optical reflections that were produced when user David had a beard; and/or the fresh sampling of the optical signal that is reflected from the user David, may be more similar to the historic sampling, relative to fresh sampling that are collected from an impostor or attacker Henry. In other words, the similarity between (i) the current user David without moustache, and (i) the previous user David who had a moustache, may be greater than the similarity between (I) a current user Henry, and (II) the previous user David who had a moustache.

It is noted that some embodiments of the present invention need not necessarily utilize a repository for long-term storage of extracted user-specific features; and/or need not necessarily perform a comparison process or a matching process of a fresh feature against a historic feature or against a pool of previously-extracted features; and/or need not necessarily require a "training period" in which features are firstly collected and only subsequently they are actually used for authentication. Rather, some embodiments may operate autonomously and immediately without comparing or matching a fresh user-extracted feature to a previously-extracted feature; for example, by comparing a freshly-extracted feature of a current user, to one or more reference values or threshold values which may indicate that the current user lacks Liveness, or that a Replay Attack may be taking place.

In a first example, user Adam may attempt to authenticate to the system as if he was user Bob, by standing in front of system 100, and by holding a real-life size printed photograph of the face of user Bob, while also initiating playback of a recorded audio message in which user Bob was recorded saying "My name is Bob Smith". Although the audio sample may match the user-specific voice of user Bob, the system of the present invention may utilize its optical microphone to deduce that the "facial regions" of the user that attempts to authenticate, do not vibrate (at all, or sufficiently), or they do not vibrate in a manner that corresponds to the utterances that were heard acoustically; and therefore the reflected optical signals do not match those that were expected to be received if indeed a Live user Bob was standing and speaking there. The flat image of the photograph, that is being held by the impostor Adam, does not reflect back the optical signals or the laser beam(s), in the same manner that a Live person having actual face would reflect them, with the facial skin vibrations that are involved.

In a second example, the system may similarly detect that the impostor user Adam is standing in front of the system, and instead of holding a photograph of the real user Bob, the impostor Adam holds a tablet (or smartphone) which shows an audio-video clip in which user Bob's face is clearly seen saying "My name is Bob Smith". The flat screen of the tablet (or smartphone) that is being held by the impostor Adam, does not reflect back the optical signals or the laser beam(s), in the same manner that a Live person having actual face would reflect them, with the facial skin vibrations that are involved.

In a third example, the system may similarly detect that the impostor user Adam is standing in front of the system, and instead of holding a photograph of the real user Bob, the impostor Adam holds a three-dimensional doll or manikin or sculpture that resembles the real face of user Bob, and also playbacks a recorded audio clip in which the real user Bob says "My name is Bob Smith". The three-dimensional doll or manikin or sculpture that is being held by the impostor Adam, even if user Adam causes it to move (e.g., similar to a puppet master that moves the lips of a puppet), does not reflect back the optical signals or the laser beam(s), in the same manner that a Live person having actual face would reflect them, with the facial skin vibrations that are involved.

In a fourth example, the system may similarly detect that the impostor user Adam is standing in front of the system, and moves his lips to say the words "My name is Bob Smith", while at the same time user Adam also playbacks a recorded audio clip in which the real user Bob says "My name is Bob Smith". The unique facial features of user Adam, may vibrate in a different manner and may reflect the optical signals and/or the laser beams differently when compared to the reflection of optical signals by the facial regions of the real user Bob; and the system may thus detect or may estimate that a Replay Attack is being performed.

The above-mentioned fraud attempts may thus be detected, by a Liveness detector 155, and/or by a Replay Attack detector 156, which may be pre-configured to detect such fraud attempts based on an analysis that indicates that the reflected optical signal—for example, reflected back from a photograph or from a screen or from a doll—does not exhibit facial vibrations that would have been expected if a real-life user would attempt to authenticate. In a demonstrative implementation, the fresh user-extracted features that were extracted by using the optical microphone, may be compared to a reference value or a reference threshold value of, for example, minimum vibrations that are expected to be exhibited by a face of a speaking human; thereby enabling the system to estimate or detect a replay attack, or to confirm (or deny) Liveness of a current user It is noted that the Liveness Detector 155 may estimate, or may determine, or may take into account, determinations with regard to velocity of the reflected optical signal(s) that are reflected back from the skin of the human speaker towards the optical microphone 101; since such velocity may be utilized by the Liveness Detector 155 and/or by the optical microphone 101 (or by a spectrum analysis unit thereof) in order to estimate or determine the elasticity or the relative-elasticity of the skin (e.g., facial skin) of the human speaker. Applicants have realized the human skin and/or human membrane differ from other objects in the characteristics of reflected optical signals, including the velocity thereof; and furthermore, the characteristics of the optical signals that are reflected from the facial skin of Person A are different from those reflected from the facial skin of Person B. The velocity of the reflected optical signal(s) may also be affected by body movements (e.g., which may be in a pre-defined velocities range, such as a range of high velocities that is higher than a pre-defined threshold), and/or may be affected by speech movements (e.g., which may be in a pre-defined velocities range, such as a range of low velocities, and/or may be characterized by having a low amplitude that is lower than a threshold amplitude value, and/or in a particular range of speech frequencies that may be lower than a threshold frequency value). Accordingly, the Liveness Detector 155 may utilize a skin elasticity module or sub-unit, to estimate the facial skin elasticity of a particular human speaker, based on the velocity or velocities or range-of-velocities of the optical signal(s) that are reflected back from the skin of the human speaker.

The user authentication module 133 may optionally comprise a Voice/Speech Biometric Module 157, able to collect a fresh audio sample or a fresh acoustic sample (e.g., through the acoustic microphone 102) from a current user attempting to authenticate; and able to compare it or match it, or to otherwise perform biometric analysis on it, in relation to a previously-collected acoustic sample or acoustic signature or audio sample or audio signature. Optionally, the user authentication module may authenticate a user based on a combination of two conditions: (I) if the fresh output of the optical microphone indicates a match with a previous output thereof, and (II) if the fresh acoustic sample is identical or similar to a previously-captured acoustic sample. In another embodiment, for example, the user authentication module may authenticate a user based on a combination of two conditions: (I) if the freshly-extracted user-specific feature of the current user, matches a previously-extracted feature of a particular previously-authenticated user; and (II) if the fresh acoustic sample is identical or similar to a previously-captured acoustic sample The user authentication module 133 (or system 100) may optionally comprise an acoustic signal enhancer unit 158, able to enhance or improve or filter the acoustic signal captured by the acoustic microphone 102, based on an the self-mix signal of the optical microphone 101, or based on an analysis of the self-mix signal of the optical microphone. For example, the acoustic signal enhancer unit 158 may comprise or may utilize a dynamic filter generator 159, able to dynamically construct and apply (to the acquired acoustic signal) a digital filter to clean the acoustic signal and/or reduce noise from the acoustic signal and/or otherwise increase the Signal to Noise Ratio (SNR) of the acoustic signal. Then, the enhanced or filtered or cleaned acoustic signal, may be utilized by the Voice/Speech Biometric Module 157, optionally in combination with the similarity of the reflected optical signal as analyzed by the self-mix process in the optical microphone, in order to authenticate the user.

It is noted that in some implementations, the Voice/Speech Biometric Module 157 may utilize one or more other types of acoustic samples or data samples, or a voice sample or voice print, which may not necessarily be merely an acoustic recording or raw acoustic sounds, and/or which may not necessarily be a cleaned or digitally-cleaned or filtered or digitally-filtered acoustic recording or acoustic data. For example, the Voice/Speech Biometric Module 157 may optionally utilize, in addition to or instead of the other samples or data as described above, one or more of the following as part of a user authentication process: (a) the speech signal, or estimated or detected speech signal, as determined by the optical microphone 101 based on an analysis of the self-mixed optical signals; (b) an acoustic sample as captured by the acoustic microphone 102, by itself and/or in combination with the speech signal estimated by the optical microphone 101; (c) an acoustic sample as captured by the acoustic microphone 102 and as cleaned or digitally-cleaned or filtered or digitally-filtered or otherwise digitally-adjusted or digitally-modified based on the speech signal estimated by the optical microphone 101; (d) a voice print or speech sample which is acquired and/or produced by utilizing one or more biometric algorithms or sub-modules, such as a Neural Network module or a Hidden Markov Model (HMM) unit, which may utilize both the acoustic signal and the optical signal (e.g., the self-mixed signals of the optical microphone 101) in order to extract more data and/or more user-specific characteristics from utterances of the human speaker.

The user authentication module 133 (or system 100) may optionally comprise a facial vibrations estimator 159, able to estimate or determine or detect one or more properties or user-specific features or characteristics, of vibrations of the skin or face, or skin-portions or skin regions, or face portions or face regions, which vibrate or move as the human speaker utters words or speaks. Applicants have realize that every human speaker may have a unique and user-specific set of facial features, which in turn may cause a different type of facial vibrations, or may cause facial vibrations having different and user-specific features or characteristics, that can be measured remotely by using a remote optical microphone (e.g., optical microphone 101). The reflected optical signal which is reflected from the face of the human speaker, when self-mixed by the optical microphone 101 with the outgoing optical signal (or a copy or replication thereof), may enable the optical microphone 101 to perform a spectral analysis of the self-mixed optical signal, and to extract therefrom user-specific characteristics that correspond to the unique facial vibrations of each human user, which in turn correspond to unique user-specific physiological features (e.g., size of mouth and lips; size of nose and chin), behavioral features (e.g., the manner in which the user pronounces the sound "S" or the sound "Z" or the sound "O"), and/or other user-specific features (e.g., whether or not the user has a beard or a moustache, which may hide some of the facial skin and thus may cause less vibrations when compared to a speaker that does not have a beard and a moustache). Accordingly, the user authentication module 133 may thus extract the characteristics of facial vibrations of a speaker; and may utilize them subsequently, by themselves and/or in combination with other biometric features and/or authentication factors, in order to authenticate the user.

In a demonstrative implementation, the facial vibrations estimator 159 may comprise or may utilize, or may be associated with, for example: (a) an estimator of facial vibrations amplitude, able to estimate the user-specific amplitude (or strength, or intensity) of facial vibrations of a human speaker (e.g., or a statistical function or other function related to such amplitude, such as the average or mean amplitude over a time-slot); (b) an estimator of facial vibrations characteristics, able to estimate or extract other user-specific features that relate to, or describe, the facial vibrations of the human speaker. These units may operate by analyzing the self-mix signal of the optical microphone 101, by using one or more spectral analysis techniques.

The user authentication module 133 (or system 100) may optionally comprise a speckles estimator 160 able to estimate or determine or detect one or more properties or user-specific features or characteristics, such as amount and/or size and/or pattern and/or vibrations, of speckles (or speckle noise) that may occur when the optical signal (e.g., one or more laser beams) are transmitted from the optical microphone 101, reach or "hit" the face of the human speaker, and are reflected back therefrom. Applicants have realized that due to the different and unique facial features of every human speaker, each human face may cause different, user-specific, speckles or speckle-noise, which may have unique characteristics; which may be estimated by performing spectral analysis of the self-mix signal in the optical microphone 101; thereby extracting a unique, user-specific, feature or set-of-features, which may then be utilized for user authentication, by itself (or by themselves) and/or in combination with other biometric features and/or authentication parameters.

It is noted that in some embodiments, the optical microphone 101 may not, or does not, acquire a visible "image" of the speckles noise or speckles pattern, since such speckles may not be readily visible to human eye or to an imager; but rather, the optical microphone 101 and/or the speckles estimator 160 may estimate or may determine the temporal behavior or the temporal characteristics of the power reflected back from the head of the human speaker, which in turn may indicate, or may enable the speckles estimator 160 to estimate, the speckles noise pattern or characteristics, which in turn may be a user-specific characteristic since speckles noise may depend, among other parameters, on the particular three-dimensional features of the face of the human speaker and/or its characteristics (e.g., beard, moustache) and/or its activity (e.g., the manner in which the speaker moves his face-regions when pronouncing certain words or phrases or utterances).

In a demonstrative implementation, the speckles estimator 160 may comprise or may utilize, or may be associated with, for example: (a) a speckles pattern estimator or detector, able to detect or estimate a user-specific pattern of speckles (e.g., a generally circular pattern of speckles for user Adam, or a generally egg-shaped or oval pattern of speckles for user Bob); (b) a speckles amount estimator or detector, able to detect or estimate a number or an amount of speckles or speckle-points or speckle-batches (e.g., three speckle-batches for user Adam who has a beard; and seven speckle-batches for user Jane who does not have a beard); (c) a speckles vibrations estimator or detector, able to estimate or detect the level or relative-level of vibrations of speckles or of speckle-noise or speckle-points of a user (e.g., speckles of user Adam vibrate or move or shift rapidly, or are displaced rapidly over time, relative to pre-defined threshold values of velocity and/or displacement; whereas, speckles of user Jane vibrate or move or shift slowly, or are displaced slowly over time, relative to said pre-defined threshold values of velocity and/or displacement). Other user-specific speckles-related features may be extracted or estimated or detected, and may then be used for user authentication, by themselves and/or in combination with other biometric features, user-specific features, and/or authentication parameters.

The user authentication module 133 (or system 100) may optionally comprise a facial movement estimator 161 able to estimate or determine or detect one or more properties or facial movements (e.g., moving or tilting of the entire head, or portions thereof), based on an analysis of the self-mix signal as processed by the optical microphone 101. Applicants have realized that each human speaker may exhibit certain user-specific head-movements when speaking in general, or may uttering certain words or sounds in particular; including movement of the entire head or face, or movement of particular face regions or face portions or body parts (e.g., movement of lips, jaws, chin). In some implementations, an imager or camera may acquire an image and/or video of the human speaker or of the face area or head area of the human speaker; and the facial movement estimator 161 may operate by analyzing or extracting head movements or facial movements that characterize a particular speaking user. Additionally or alternatively, the facial movement estimator may extract or estimate such user-specific face movements or head movements, of a speaking user, from the self-mixed optical signal of the optical microphone. For example, a reflected spectrum characteristics detector may extract from the self-mixed optical signal, spectral characteristics that indicate the effect user-specific head movements or face movements on the spectrum of the reflected optical signal and thus on the spectrum of the self-mixed signal. Such extracted user-specific features may then be used for user authentication, by themselves and/or in combination with other biometric features, user-specific features, and/or authentication parameters.

In some embodiments, system 100 and/or the user authentication module may comprise, or may utilize, a three-dimensional-model generator 162 able to generate a three-dimensional model or representation of the face or head (of face-regions or face-portions) of the human speaker, based on spectral analysis of the self-mixed optical signal. Optionally, a laser transmitter or other optical beam transmitter of the optical microphone 101 or of system 100, may move (e.g., by using a motor, or other displacement mechanism) in order to "scan" the entire face of the user or portions thereof; and/or a matrix or array of multiple laser beams or optical beams may be transmitted towards the face of the speaker (e.g., using multiple laser transmitters or multiple optical transmitters); and/or an optics assembly (e.g., beam splitter(s), beam divider(s), prisms, lenses, mirrors, and/or other suitable optic elements) may be utilized in order to allow a single optical transmitter (or multiple optical transmitters) to utilize a multiplicity of optical beams or laser beams, for scanning multiple regions of the face or head of the human speaker. Based on the received (reflected) optical signal(s), and/or based on the self-mixed signal(s) in the optical microphone 101, a three-dimensional model may be constructed or generated, corresponding to three-dimensional features of the face or head of the human speaker, which affect differently and in a user-specific manner the vibrations of the facial skin of the user, which in turn affect differently the reflected optical signal and thus the self-mixed signal. The generated user-specific three-dimensional model, may then be used for user authentication, by itself and/or in combination with other biometric features, user-specific features, and/or authentication parameters.

User authentication module 133 may be associated with, or may comprise, or may utilize, or may operate in conjunction with, one or more other Biometric/Behavioral Identification Unit(s) 163, which may collect, capture, acquire, process, extract and/or analyze other user-specific features; for example, an imager and a face recognition module; a voice/speech recognition module; a fingerprints reader and analyzer; a retina scanner or eye scanner; a palm scanner or hand scanner; a unit that tracks and/or extracts behavioral features of a user that may be performed prior to, or subsequently to, or during, an authentication process (e.g., identifying that a user rotates or tilts or spins or lifts an authentication device or a handheld device, prior to or during or after an authentication process); and/or other suitable units. Optionally, user authentication module 133 may operate after, or during, or before, or in parallel to, a process in which the user is requested or required to perform one or more operations (e.g., to speak and say an utterance; to pose for an image; to provide a fingerprint sample; to swipe a magnetic card; to utilize a physical token for authentication), and/or in addition to (or instead of) performing one or more other authentication steps or authentication factors (e.g., entering a password or passphrase or Personal Identification Number (PIN); answering a security question; responding to a security challenge; solving a CAPTCHA challenge; or the like).

Some embodiments of the present invention may comprise an optical microphone or laser microphone or a laser-based microphone, or optical sensor or laser sensor or laser-based sensor, which utilizes multiple lasers or multiple laser beams or multiple laser transmitters, in conjunction with a single laser drive component and/or a single laser receiver component, thereby increasing or improving the efficiency of self-mix techniques or module or chamber (or self-mix interferometry techniques or module or chamber) utilized by such optical or laser-based microphone or sensor.

In some embodiments of the present invention, which may optionally utilize a laser microphone or optical microphone, the laser beam or optical beam may be directed to an estimated general-location of the speaker; or to a pre-defined target area or target region in which a speaker may be located, or in which a speaker is estimated to be located. For example, the laser source may be placed inside a vehicle, and may be targeting the general location at which a head of the driver is typically located. In other embodiments, a system may optionally comprise one or more modules that may, for example, locate or find or detect or track, a face or a mouth or a head of a person (or of a speaker), for example, based on image recognition, based on video analysis or image analysis, based on a pre-defined item or object (e.g., the speaker may wear a particular item, such as a hat or a collar having a particular shape and/or color and/or characteristics), or the like. In some embodiments, the laser source(s) may be static or fixed, and may fixedly point towards a general-location or towards an estimated-location of a speaker. In other embodiments, the laser source(s) may be non-fixed, or may be able to automatically move and/or change their orientation, for example, to track or to aim towards a general-location or an estimated-location or a precise-location of a speaker. In some embodiments, multiple laser source(s) may be used in parallel, and they may be fixed and/or moving.

In some demonstrative embodiments of the present invention, which may optionally utilize a laser microphone or optical microphone, the system and method may efficiently operate at least during time period(s) in which the laser beam(s) or the optical signal(s) actually hit (or reach, or touch) the face or the mouth or the mouth-region of a speaker. In some embodiments, the system and/or method need not necessarily provide continuous speech enhancement or continuous noise reduction; but rather, in some embodiments the speech enhancement and/or noise reduction may be achieved in those time-periods in which the laser beam(s) actually hit the face of the speaker. In other embodiments, continuous or substantially-continuous noise reduction and/or speech enhancement may be achieved; for example, in a vehicular system in which the laser beam is directed towards the location of the head or the face of the driver.

The system(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules. The system(s) of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

Some embodiments of the present invention may comprise, or may utilize, or may be utilized in conjunction with, one or more elements, units, devices, systems and/or methods that are described in U.S. Pat. No. 7,775,113, titled "Sound sources separation and monitoring using directional coherent electromagnetic waves", which is hereby incorporated by reference in its entirety.

Some embodiments of the present invention may comprise, or may utilize, or may be utilized in conjunction with, one or more elements, units, devices, systems and/or methods that are described in U.S. Pat. No. 8,286,493, titled "Sound sources separation and monitoring using directional coherent electromagnetic waves", which is hereby incorporated by reference in its entirety.

Some embodiments of the present invention may comprise, or may utilize, or may be utilized in conjunction with, one or more elements, units, devices, systems and/or methods that are described in U.S. Pat. No. 8,949,118, titled "System and method for robust estimation and tracking the fundamental frequency of pseudo periodic signals in the presence of noise", which is hereby incorporated by reference in its entirety.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

In some embodiments, a system comprises: an optical microphone (a) to transmit an outgoing optical signal towards a face of a human speaker, (b) to receive an incoming optical feedback that is reflected back from said face of said human speaker, (c) to perform self-mix interferometry that is based on said outgoing optical signal and said incoming optical signal, and (d) based on said self-mix interferometry, to generate a user-specific characteristic that characterizes said human speaker; and a user authentication module to authenticate said user for performing a privileged action, based on said user-specific characteristic that was generated from said self-mix interferometry.

In some embodiments, the user authentication module is to authenticate a user based on a comparison between: (i) a freshly-generated user-specific characteristic that is freshly generated for a current user who attempts to authenticate via said optical microphone, and (ii) a previously-generated user-specific characteristic that was previously generated by an authorized user that was authenticated via said optical microphone.

In some embodiments, the system comprises: a similarity estimation unit to determine a similarity score indicating a level of similarity between (i) a freshly-generated user-specific characteristic that is freshly generated for a current user who attempts to authenticate via said optical microphone, and (ii) a previously-generated user-specific characteristic that was previously generated by an authorized user that was authenticated via said optical microphone; wherein the user authentication module is to authenticate said current user if said similarity score is greater than a pre-defined similarity threshold.

In some embodiments, the system comprises: an acoustic microphone to capture acoustic output that is produced by said human user; a dynamic filter generator to dynamically generate a digital filter for cleaning noises from said acoustic output that was captured by the acoustic microphone, based on output produced by said optical microphone, and to produce a dynamically-cleaned acoustic sample; wherein the user authentication module is to authenticate said user for performing said privileged action, based on a combination of both: (i) said user-specific characteristic that was generated from said self-mix interferometry, and (ii) biometric similarity between said dynamically-cleaned acoustic sample and a previously-captured acoustic sample of said human user.

In some embodiments, the system comprises: an amplitude of facial vibrations estimator, to receive output generated by said optical microphone, and to generate therefrom a facial vibration indicator value that indicates a level of vibrations of a facial region of said human speaker; wherein the user authentication module comprises a facial vibrations similarity detector, to detect a level of similarity between: (i) a freshly-generated facial vibrations indicator value, that is freshly generated for a current user who attempts to authenticate via said optical microphone, and (ii) a previously-generated facial vibrations indicator value that was previously generated by an authorized user that was authenticated via said optical microphone; wherein said user authentication module is to authenticate said current user based on output indicating said level of similarity that is produced by said facial vibrations similarity detector.

In some embodiments, the system comprises: a speckles pattern detector, to extract, from a self-mix optical signal of said optical microphone, a unique user-specific pattern of speckles that characterize the incoming optical signal that is reflected back from said human user; wherein the user authentication module comprises a speckles pattern similarity detector, to detect a level of similarity between: (i) a freshly-generated speckles pattern, that is freshly generated for a current user who attempts to authenticate via said optical microphone, and (ii) a previously-generated speckles pattern that was previously generated by an authorized user that was authenticated via said optical microphone.

In some embodiments, the system comprises: a speckles vibrations detector, to extract, from a self-mix optical signal of said optical microphone, a unique user-specific vibrations pattern of vibrating speckles that characterize the incoming optical signal that is reflected back from said human user; wherein the user authentication module comprises a speckles pattern similarity detector, to detect a level of similarity between: (i) a freshly-generated speckles vibrations pattern, that is freshly generated for a current user who attempts to authenticate via said optical microphone, and (ii) a previously-generated speckles vibrations pattern that was previously generated by an authorized user that was authenticated via said optical microphone.

In some embodiments, the system comprises: a speckles amount detector, to extract, from a self-mix optical signal of said optical microphone, a unique user-specific number indicating an amount of speckles that characterize the incoming optical signal that is reflected back from said human user; wherein the user authentication module comprises a speckles pattern similarity detector, to detect a level of similarity between: (i) a freshly-generated speckles amount number, that is freshly generated for a current user who attempts to authenticate via said optical microphone, and (ii) a previously-generated speckles amount number that was previously generated by an authorized user that was authenticated via said optical microphone.

In some embodiments, the system comprises: a facial movement detector, to utilize output generated by said optical microphone in order to generate a unique user-specific number indicating a level of movement of a face of a speaking user, that characterize a manner in which said speaking user moves his head while speaking; wherein the user authentication module comprises a facial movement similarity detector, to detect a level of similarity between: (i) a freshly-generated facial movement indicator, that is freshly generated for a current user who attempts to authenticate via said optical microphone, and (ii) a previously-generated facial movement indicator that was previously generated by an authorized user that was authenticated via said optical microphone.

In some embodiments, the system comprises: an average reflected spectrum detector, to utilize output generated by said optical microphone in order to generate a unique user-specific number indicating an average of a spectrum of reflected optical signals that are reflected from a face of a speaking user, that characterize a manner in which the face of said speaking user reflects optical signal; wherein the user authentication module comprises a facial movement similarity detector, to detect a level of similarity between: (i) a freshly-generated average reflected spectrum indicator, that is freshly generated for a current user who attempts to authenticate via said optical microphone, and (ii) a previously-generated average reflected spectrum indicator that was previously generated by an authorized user that was authenticated via said optical microphone.

In some embodiments, the system comprises: one or more laser receivers, to receive multiple laser beams that are reflected from said face of said human user; a three-dimensional-model generator to analyze the multiple reflected laser beam and their relation to said outgoing optical signal, and to generate therefrom a three-dimensional-model that corresponds to physiological features of said face of said human user; wherein the user authentication module comprises a three-dimensional-model similarity detector, to detect a level of similarity between: (i) a freshly-generated three-dimensional-model of physiological facial features, that is freshly generated for a current user who attempts to authenticate via said optical microphone, and (ii) a previously-generated three-dimensional-model of physiological facial features, that was previously generated by an authorized user that was authenticated via said optical microphone.

In some embodiments, the system comprises: a plurality of laser transmitters to transmit a plurality of laser beams towards said face of said human user.

In some embodiments, the system comprises: a single laser transmitter to transmit a single laser beam at a time; a motor to move said single laser transmitter, and to cause said single laser transmitter to transmit said single laser beam over time towards different regions of said face of said human user.

In some embodiments, the system comprises: a single laser transmitter to transmit a single laser beam at a time; a beam splitter to split said single laser beam into two or more laser beams that reach different regions of said face of said human user.

In some embodiments, the system comprises: a replay attack detector to detect that a fraudulent authentication attempt is attempted by a replay of a non-fresh previously-recorded acoustic sample, based on a difference between (I) fresh speckles noise of a freshly-captured reflected optical signal, and (II) previously-determined speckles noise that characterized a previous acoustic sample of a previously-authenticated user.

In some embodiments, the system comprises: a liveness detector to detect liveness of a current user who attempts to authenticate by uttering a speech, wherein the liveness detector is to compare between: (I) a freshly generated output of said optical microphone that receives fresh optical signal reflected from said current user, and (II) an expected optical signal that is expected to be reflected from said current user if said current user is actually uttering said speech.

In some embodiments, the system comprises: a speckles pattern detector, to extract, from a self-mix optical signal of said optical microphone, a unique user-specific pattern of speckles that characterize the incoming optical signal that is reflected back from said human user, based on spectral analysis of temporal behavior of power of optical signals reflected from said human speaker; wherein the user authentication module comprises a speckles pattern similarity detector, to detect a level of similarity between: (i) a freshly-generated speckles pattern, that is freshly generated for a current user who attempts to authenticate via said optical microphone, and (ii) a previously-generated speckles pattern that was previously generated by an authorized user that was authenticated via said optical microphone.

In some embodiments, the system comprises: an acoustic microphone to capture acoustic output that is produced by said human user; a Neural Network module to apply a neural network algorithm that extracts a user-specific characteristic from both: (I) an acoustic signal acquired by the acoustic microphone, and (II) reflected optical signals that are reflected back from the human speaker to the optical microphone; wherein the user authentication module is to authenticate said user for performing said privileged action, based on said user-specific characteristics that was extracted from both: (I) the acoustic signal acquired by the acoustic microphone, and (II) the reflected optical signals that are reflected back from the human speaker to the optical microphone.

In some embodiments, the system comprises: an acoustic microphone to capture acoustic output that is produced by said human user; a Hidden Markov Model (HMM) unit to construct a Hidden Markov Model (HMM) that indicates a user-specific characteristic from both: (I) an acoustic signal acquired by the acoustic microphone, and (II) reflected optical signals that are reflected back from the human speaker to the optical microphone; wherein the user authentication module is to authenticate said user for performing said privileged action, based on said user-specific characteristics that was extracted from both: (I) an acoustic signal acquired by the acoustic microphone, and (II) reflected optical signals that are reflected back from the human speaker to the optical microphone.

In some embodiments, the system comprises: a liveness detector to detect liveness of a current user who attempts to authenticate by uttering a speech, wherein the liveness detector is to estimate facial skin elasticity of the human speaker based on spectral analysis of reflected optical signals that are reflected back from the human speaker to the optical microphone.

In some embodiments, the optical microphone is part of a hybrid optical-and-acoustic sensor which is further able to acquire an acoustic signal of said human speaker.

In some embodiments, the optical microphone is embedded in an electronic device selected from the group consisting of: a smartphone, a tablet, a laptop computer.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A system comprising:
a laser-based self-mix microphone (a) to transmit an outgoing laser signal towards a face of a human speaker, (b) to receive an incoming optical feedback that is reflected back from said face of said human speaker as reflected feedback to said outgoing laser signal, (c) to perform laser self-mix interferometry of said outgoing laser signal and said incoming optical feedback, and (d) based on said laser self-mix interferometry, to generate a user-specific laser self-mix characteristic that uniquely characterizes laser self-mixing of said outgoing laser signal with said incoming optical feedback that is reflected back from said face of said human speaker, wherein said user-specific laser self-mix characteristic uniquely distinguishes between said human speaker and other human speakers;
a user authentication module to authenticate said human speaker for performing a privileged action, based on said user-specific laser self-mix characteristic that was generated by said laser self-mix interferometry of the outgoing laser signal with said the incoming optical feedback that is associated with said human speaker.

2. The system of claim 1,
wherein the user authentication module is to authenticate a user based on a comparison between: (i) a freshly-generated user-specific laser self-mix characteristic that is freshly generated for a current user who attempts to authenticate via said laser-based self-mix microphone, and (ii) a previously-generated user-specific laser self-mix characteristic that was previously generated by an authorized user that was authenticated via said laser-based self-mix microphone.

3. The system of claim 1, comprising:
a similarity estimation unit to determine a similarity score indicating a level of similarity between (i) a freshly-generated user-specific laser self-mix characteristic that is freshly generated for a current user who attempts to authenticate via said laser-based self-mix microphone, and (ii) a previously-generated user-specific laser self-mix characteristic that was previously generated by an authorized user that was authenticated via said laser-based self-mix microphone;
wherein the user authentication module is to authenticate said current user if said similarity score is greater than a pre-defined similarity threshold.

4. The system of claim 1, comprising:
an acoustic microphone to capture acoustic output that is produced by said human speaker;
a dynamic filter generator to dynamically generate a digital filter for cleaning noises from said acoustic output that was captured by the acoustic microphone, based on output produced by said laser-based self-mix microphone, and to produce a dynamically-cleaned acoustic sample;
wherein the user authentication module is to authenticate said user for performing said privileged action, based on a combination of both: (i) said user-specific laser self-mix characteristic that was generated from said laser self-mix interferometry of said outgoing laser signal with said incoming optical feedback, and (ii) biometric similarity between said dynamically-cleaned acoustic sample and a previously-captured acoustic sample of said human speaker.

5. The system of claim 1, comprising:
an amplitude of facial vibrations estimator, to receive output generated by said laser-based self-mix microphone, and to generate therefrom a facial vibration indicator value that indicates a level of vibrations of a facial region of said human speaker;
wherein the user authentication module comprises a facial vibrations similarity detector, to detect a level of similarity between: (i) a freshly-generated facial vibrations indicator value, that is freshly generated for a current user who attempts to authenticate via said laser-based self-mix microphone, and (ii) a previously-generated facial vibrations indicator value that was previously generated by an authorized user that was authenticated via said laser-based self-mix microphone;
wherein said user authentication module is to authenticate said current user based on output indicating said level of similarity produced by said facial vibrations similarity detector.

6. The system of claim 1, comprising:
a speckles pattern detector, to extract, from a laser self-mix signal generated by laser self-mixing at said laser-based self-mix microphone, a unique user-specific laser-based pattern of laser-related speckles that characterize the incoming optical feedback that is reflected back from said face of said human speaker and indicates laser-based speckles detected on said human speaker;
wherein the user authentication module comprises a speckles pattern similarity detector, to detect a level of similarity between: (i) a freshly-generated speckles pattern, that is freshly generated for a current user who attempts to authenticate via said laser-based self-mix microphone, and (ii) a previously-generated speckles pattern that was previously generated by an authorized user that was authenticated via said laser-based self-mix microphone.

7. The system of claim 1, comprising:
a speckles vibrations detector, to extract, from a laser self-mix signal generated by laser self-mixing at said laser-based self-mix microphone, a unique user-specific laser-based vibrations pattern of vibrating laser speckles that characterize the incoming optical feedback that is reflected back from said face of said human speaker and indicates vibrations of laser-based speckles on said human speaker;
wherein the user authentication module comprises a speckles pattern similarity detector, to detect a level of similarity between: (i) a freshly-generated laser-based speckles vibrations pattern, that is freshly generated for a current user who attempts to authenticate via said laser-based self-mix microphone, and (ii) a previously-generated speckles vibrations pattern that was previously generated by an authorized user that was authenticated via said laser-based self-mix microphone.

8. The system of claim 1, comprising:
a speckles amount detector, to extract, from a laser self-mix signal generated by said laser-based self-mix microphone, a unique user-specific number indicating an amount of speckles that characterize the incoming optical feedback that is reflected back from said face of said human speaker;
wherein the user authentication module comprises a speckles pattern similarity detector, to detect a level of similarity between: (i) a freshly-generated speckles amount number, that is freshly generated for a current user who attempts to authenticate via said laser-based self-mix microphone, and (ii) a previously-generated speckles amount number that was previously generated by an authorized user that was authenticated via said laser-based self-mix microphone.

9. The system of claim 1, further comprising:
a replay attack detector to detect that a fraudulent authentication attempt is attempted by a replay of a non-fresh previously-recorded acoustic sample, based on a difference between (I) fresh laser-based speckles noise of a freshly-captured reflected optical signal that is reflected back as feedback to said outgoing laser signal, and (II) previously-determined speckles noise that characterized a previous sample of a previously-authenticated user.

10. The system of claim 1, further comprising:
a liveness detector to detect liveness of a current user who attempts to authenticate by uttering a speech, wherein the liveness detector is to compare between: (I) a freshly generated output of said laser-based self-mix microphone that receives fresh incoming optical feedback reflected back from said face of said current user in response to said outgoing laser signal, and (II) an expected optical feedback signal that is expected to be reflected from said current user if said current user is actually uttering said speech while being hit by said outgoing laser signal.

11. The system of claim 1, further comprising:
a liveness detector to detect liveness of a current user who attempts to authenticate by uttering a speech, wherein the liveness detector is to estimate facial skin elasticity of the human speaker based on spectral analysis of reflected optical feedback signals that are reflected back from said face of said human speaker in response to said outgoing laser signal transmitted by said laser-based self-mix microphone.

12. The system of claim 1, wherein the laser-based self-mix microphone comprises a laser beam transmitter to transmit said outgoing laser signal, and further comprises a laser self-mix interferometry unit to perform said laser self-mix interferometry of said outgoing laser signal with said reflected optical feedback, and is part of a hybrid optical-and-acoustic sensor which is further able to acquire an acoustic signal of said human speaker.

13. The system of claim 1, wherein the laser-based self-mix microphone comprises a laser beam transmitter to transmit said outgoing laser signal, and further comprises a laser self-mix interferometry unit to perform said laser self-mix interferometry of said outgoing laser signal with said reflected optical feedback, and is embedded in an electronic device selected from the group consisting of: a smartphone, a tablet, a laptop computer.

* * * * *